July 28, 1953  W. K. SMITH  2,647,072
METHOD OF JOINING PLASTIC ELEMENTS
Filed June 16, 1947
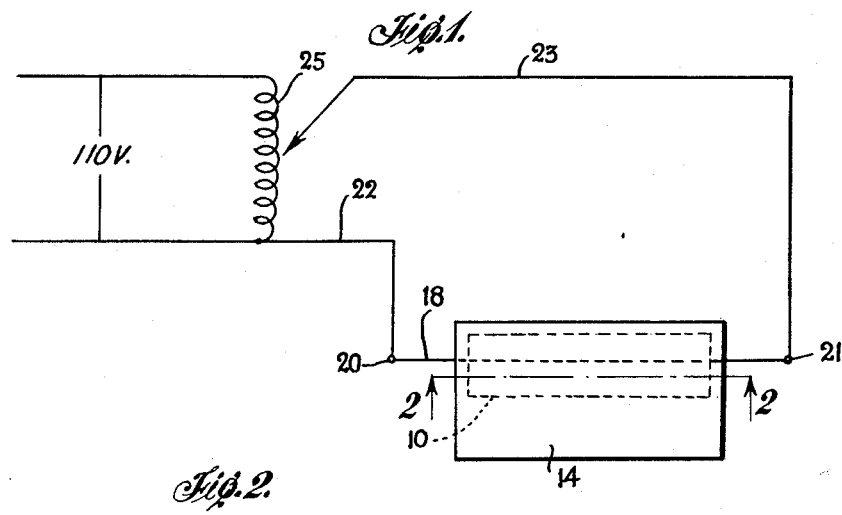
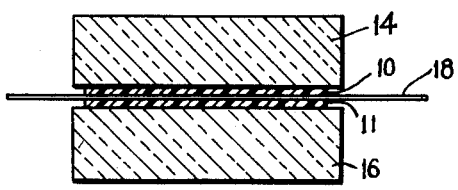
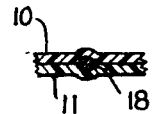
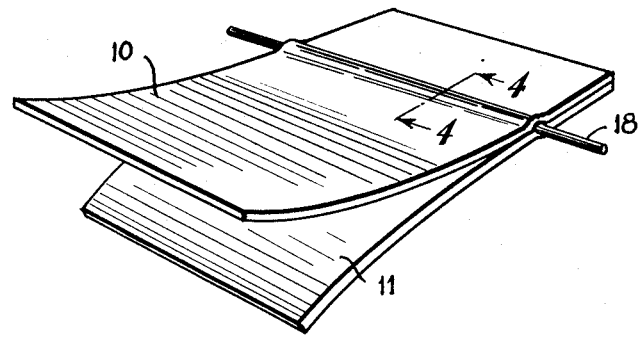
INVENTOR.
WALTER K. SMITH
BY
ATTORNEYS.

Patented July 28, 1953

2,647,072

UNITED STATES PATENT OFFICE 2,647,072

METHOD OF JOINING PLASTIC ELEMENTS

Walter K. Smith, Pottstown, Pa., assignor to The Firestone Tire & Rubber Company, Akron, Ohio, a corporation of Ohio Application June 16, 1947, Serial No. 754,958

1 Claim. (Cl. 154—90)

This invention relates to an improved method of heat sealing seams in plastic material.

An important object of the invention resides in the provision of an improved method for providing sealing seams in material such as plastic leather during manufacture of articles therefrom.

A more specific object of the invention is to provide a method of rapidly joining contiguous elements of thermoplastic material through the employment of electrical energy.

Another object of the invention is to provide an improved method and apparatus for securely bonding a pair of contiguously disposed thermoplastic elements while confining said bond to a determinate local area thereof, as for example, to a narrow seam.

A further object of the invention is to provide suitable means for carrying out the method above described.

Other objects and advantages will become apparent to persons skilled in the art upon examination of the drawings, the description, and the appended claim.

In the drawings:

Fig. 1 is a diagrammatic view of apparatus particularly adapted for carrying out the method of bonding;

Fig. 2 is a view taken along line 2—2 of Fig. 1 illustrating a pair of contiguously disposed elements to be joined in accordance with the principles of the invention;

Fig. 3 illustrates the elements shown in Fig. 2 bonded together along the seam in the manner taught herein; and Fig. 4 is a fragmentary section taken along line 4—4 of Fig. 3.

The increased popularity of so-called plastic material during the past few years has resulted in the widespread use of that material in manufactured articles. While the word "plastic" may be used to designate a thermosetting material, it is widely applied to various materials possessing properties of thermoplasticity. The present invention is concerned with the latter type of material. For example, many articles enjoying wide current popularity are derived from polyvinyl chloride base resins and possess thermoplastic characteristics. This material is employed in so-called "plastic leather" which may consist of a film of polyvinyl chloride calendered to a fabric base and embossed. It may not necessarily be backed by fabric or embossed. "Plastic leather," in the form most widely adopted at the present time, is embossed to resemble natural leather. This material is currently manufactured into handbags, wallets and many other items. The necessity of providing suitable bonding, especially in the form of seams, during manufacture of the finished article without substantial disfigurement of the embossed design, has presented a difficult manufacturing problem which is satisfactorily solved by the present invention.

As best shown in Figs. 1 and 2, a pair of plastic leather sheets 10 and 11 to be joined along a seam are placed intermediate slabs or blocks 14 and 16 of dielectric material such as, for example, a composition of asbestos fiber and Portland cement known in the trade as Transite. During assembling of the unit shown in Fig. 2, an electrically conductive wire 18, preferably of Nichrome, is placed intermediate the thermoplastic elements 10 and 11 to assume the pattern of a desired seam. As shown in Fig. 1, wire 18 is placed in a position to define a seam running parallel to the side margins of the two pieces of plastic leather. If it is desirable to minimize or eliminate the raised rib portion appearing on the outer surfaces of the sheets when ordinary Nichrome wire 18 is used, the wire may be flattened. Nichrome wire of .020" diameter, flattened, has been successfully employed for this purpose. The ends 20 and 21 of wire 18 are connected by lines 22 and 23 to a variable transformer or "variac" 25, which in turn is connected to a suitable source of alternating current as shown. Adjustment of variac 25 controls the heating of Nichrome wire 18 to any desired degree.

Prior to application of the heating current, slabs 14 and 16 may be placed under suitable pressure, if required. It may be found that with certain material and certain size wire, the pull of gravity on block 14 will suffice to effect the proper seal. Upon application of the heating current to a degree to render the material of elements 10 and 11 fusible in the area immediately adjacent wire 18, a sufficient amount of pressure should exist between blocks 14 and 16 to move elements 10 and 11 into contiguous relation throughout the area adjacent wire 18 to form an effective bond between the elements with wire 18 completely embedded in the thermoplastic material.

It has been found that good results are obtained if the variable transformer is operated in a manner rapidly to bring the wire to a red heat for only an instant. Sufficient heat is provided in this manner to melt the plastic material to a point enabling blocks 14 and 16 to move together to bring elements 10 and 11 into bonded engagement.

The above methods avoid destruction of the embossed pattern which occurred during unsuccessful attempts to effect a bond by applying heat from a torch or burner, and if desired, a ridge or bead may be provided on the enjoined surfaces of elements 10 and 11, the extent of said rib being dependent upon the dimensions of wire 18. It is often desirable in the manufacture of certain articles to produce ribs for design purposes.

Upon completion of the bonding operation, the wire 18 is of course left in the material to add strength and rigidity through the area of the seam, wire 18 being trimmed off as desired. It is apparent that wire 18 may readily be disposed in a configuration to produce the desired bond, internal reenforcement or artistic pattern.

What is claimed is:

The method of bonding an element of thermoplastic material to a second thermoplastic element, one of said elements having the form of a relatively thin sheet of material, which comprises placing a metallic wire between said elements, subjecting said elements to pressure to force them together, and electrically heating the wire to cause the elements to fuse and to bond together adjacent the wire embedding the wire in the elements, said sheet being molded about the wire to assume the shape of the wire forming an ornamental rib on the external surface of the sheet.

WALTER K. SMITH.

References Cited in the file of this patent

UNITED STATES PATENTS

| Number | Name | Date |
| --- | --- | --- |
| 370,091 | Scarles | Sept. 20, 1887 |
| 1,080,990 | Meyercord | Dec. 9, 1913 |
| 1,339,736 | Burke | May 11, 1920 |
| 1,350,281 | Lynah | Aug. 17, 1920 |
| 1,960,120 | Mohring | May 22, 1934 |
| 2,089,469 | Dix | Aug. 10, 1937 |
| 2,241,312 | Luty | May 6, 1941 |
| 2,340,510 | Corley | Feb. 1, 1944 |
| 2,372,929 | Blessing | Apr. 3, 1945 |
| 2,378,801 | Sidell | June 19, 1945 |
| 2,387,227 | Andersen | Oct. 23, 1945 |
| 2,393,100 | Gallay | Jan. 15, 1946 |
| 2,422,725 | Gilfillan | June 24, 1947 |
| 2,477,267 | Robinson | July 26, 1949 |
| 2,489,867 | D'Orio | Nov. 29, 1949 |

FOREIGN PATENTS

| Number | Country | Date |
| --- | --- | --- |
| 522,524 | Great Britain | June 20, 1940 |